June 14, 1927. 1,632,278

L. F DOUGLASS

METHOD OF PRODUCING COLORED PHOTOGRAPHIC FILMS

Filed Oct. 16, 1919

INVENTOR
Leon F. Douglass.
BY
*Strong & Townsend*
ATTORNEYS

Patented June 14, 1927.

1,632,278

UNITED STATES PATENT OFFICE.

LEON F. DOUGLASS, OF SAN RAFAEL, CALIFORNIA.

METHOD OF PRODUCING COLORED PHOTOGRAPHIC FILMS.

Application filed October 16, 1919. Serial No. 331,067.

This invention relates to color photography and particularly pertains to a method of producing colored photographic films.

The principal object of the present invention is to produce multi-colored pictures, particularly through the medium of motion picture photography, said pictures being obtained through the use of a film upon which at least two differently colored photographic images are contained within the same carrier; as for instance, the gelatine or colloid layer of a photographic film. While it is known that the mere production of two separate, differently colored, photographic images within a single colloid carrier is not new, this invention is a distinct improvement upon the methods heretofore used and described, and differs radically from all previous known methods.

The present invention contemplates the simultaneous or successive production of two ordinary black silver images within a single colloid carrier. These images are respective prints of the red and green color selection negatives which may be obtained by the two-color process described in my United States Patent No. 1,253,796, dated January 15, 1918, after which the images are colored in a manner to render the picture in a state of artistic agreement with the subject photographed. It would, of course, be within the spirit of the present invention to use three or more colors in the process after the two original images have been completed. This may be done by a re-sensitization or imbibition process.

This invention further differs from all previous ones having in object the same general result, in that although the two images are printed either simultaneously or successively from negatives placed on opposite sides of the colloid carrier, they are developed into two black silver images simultaneously and thereafter colored separately to the desired degree by means of a novel fractional toning and mordant dye process.

The invention is illustrated diagrammatically in the accompanying drawings in which—

Figure 1:
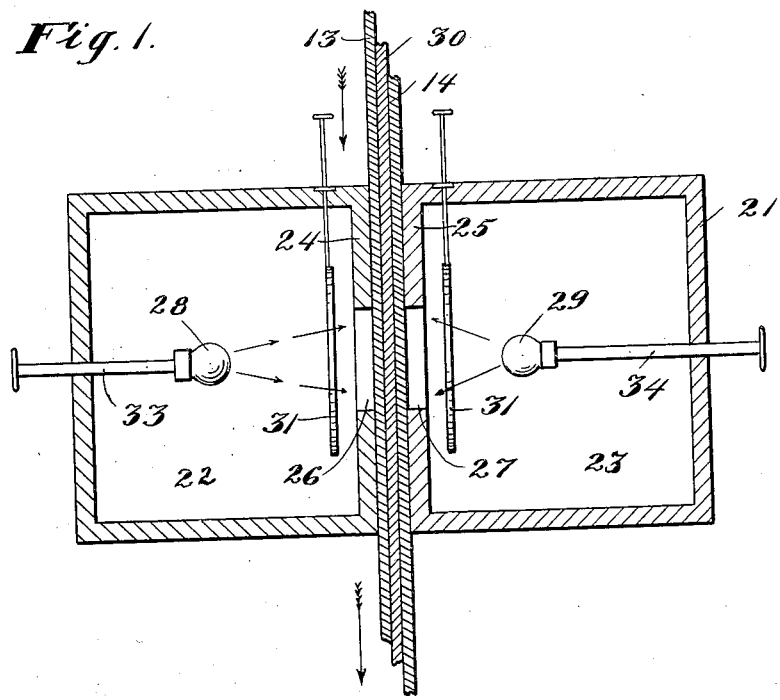
Figure 2:
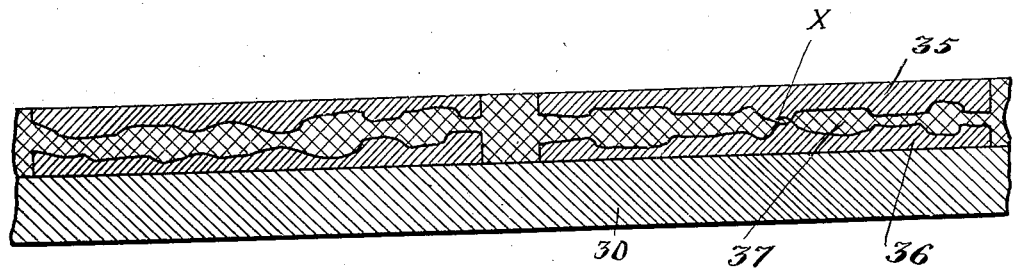

Fig. 1 shows a horizontal sectional view of a printing device which may be employed in carrying out the novel process; and Fig. 2 shows an enlarged view in section through a film illustrating diagrammatically the superimposition of a double series of images upon one side of the transparent support.

In the production of color photographs, it must be borne in mind that a condition is encountered in the taking of the original selection negatives which must later on, at some point in the process, be corrected. This is due to the fact that there is a considerable variation in the relative taking rates of red and green color selection negatives. The green usually takes at a faster rate than the red, the difference usually becoming perceptible when the photographic subject is about ten feet from the camera and rapidly increases when distant views are made. This increase varies also with the position above sea level, and at 7000 feet the green in distant views will possibly take twice as fast as the red. It will be understood that these taking rates not only vary with the distance of the camera from the photographic subject but are controlled by altitude, light and atmospheric conditions. These differences may usually be corrected in close-ups by the use of $a$ and $b$ filters of the Wratten scale. Beyond a distance of ten feet between the photographic subject and the camera other means must be used for the correction.

The effect of these differences in taking rates is that without the necessary correction, the green selection negative is more intense than the red selection negative, and this to a variable degree according to the determining factors specified above. It must be obvious then that when the green selection negative is twice the intensity of the red selection negative, the positive therefrom should carry the two selection negatives in equal intensity or at least brought to such agreement as to insure that when the positives are colored and matched they will properly blend.

In order to do this the length of exposure or the intensity of light to which the positive film is exposed through the color selection negative must be increased on one hand or decreased on the other and it may become necessary, according to the conditions under which the two series of positive images in the film are to be treated, to give the outside and inside series of positive images different intensities with relation to each other.

Having thus described the cases and conditions under which intensity differences are encountered and corrected, the means for obtaining readily such image intensity differences at will, will be described.

The printing apparatus which may be used in making the two sets of positive images within the same colloid layer is shown in Fig. 1 and comprises a suitable housing 21 within which are two compartments 22 and 23 respectively separated by partition walls 24 and 25, in which walls are formed exposure openings 26 and 27 respectively. Within the compartment 22, I arrange a source of illumination 28 in the form of an incandescent lamp carried by an adjustable support 33 which permits the lamp to be moved towards and from the exposure opening 26. A similar lamp 29 likewise carried on an adjustable support 34 is arranged within the compartment 23 and is movable as desired towards and from the exposure opening 27. Moving between the walls 24 and 25, I show two negative films 13 and 14 between which is a positive film 30. The latter is suitably sensitized on one side thereof as by means of a silver halide emulsion. Preferably a shutter 31 is interposed between each of the lamps 28 and 29 and the respective exposure openings 26 and 27.

In event that both positive images are to be formed in the simultaneous exposure, the two sources of light are made use of. If, for instance, the two sources of light have the same measured power, the amount of light reaching the plane represented by the negative film 13 from the lamp 28 will be to the amount of light reaching the negative film 14 from the lamp 29 as the reciprocals of the squares of the distances the lights 28 and 29 are respectively from the films 13 and 14. In other words, if the distance from lamp 28 to the film 13 represents 2 and the distance from lamp 29 to the film 14 represents 1, then one-fourth only of the intensity of the light obtaining at the film 14 will obtain at the film 13. The source of light should be moved closer to the sensitive film when it is desired to intensify the light and farther away when a weaker light is desired.

In the event that successive exposures are desired, only one source of light is necessary, and the positive film is reversed and passed through the printing machine to be exposed through the second negative on the side opposite to that previously exposed.

This printing machine is particularly adapted to the printing of the two black or silver images within the same carrier and to obtaining the said images of the desired intensities required for the finished picture.

Having thus obtained a single film with the two desired but still undeveloped images, the next step is to subject the film to any preferred developing process in order to secure finally a single film with a double series of distinct and separate black silver positive images having the proper intensities, superimposed and in perfect agreement. Although this double series of images, as indicated at 35 and 36 in Fig. 2 may be assumed to have a layer of clear colloid 37 separating them, there will be cases where the two images overlap, as indicated at $x$, in Fig. 2. This condition will, however, not be perceptible in the final result when it is understood that at each point where this condition exists, the final result will be a slight modification of a black color. The next step in the process is to convert the two black images into colored images by means of a new fractional and selective toning and mordant dye process with which the present invention is concerned. In order to accomplish this it will be assumed that the image representing the green selection is fifty per cent stronger in intensity than the red image, it being preferable that the green image be upon the bottom or the one nearest the projecting light. The principle of the conversion process is briefly that the top or red image is first toned into an image that will mordant the red dye. The image is then dyed, after which the bottom or green image is converted into a mordanting image and then dyed. The top image is toned with an iron blue toning solution, a preferable formula being:

Potassium bichromate, .03 grams; ferric alum, 15.00 grams; oxalic acid, 36.00 grams; potassium ferricyanide, 12.00 grams; ammonia alum, 60.00 grams; hydrochloric acid, 10%, 12.00 ccs.; water to make, 3000.00 ccs.

By using this solution an image of the intensity described will be toned in approximately one minute without the solution having penetrated or in any way affected the other image. The film is then washed in clear water for about ten minutes to remove any excess of the toning solution and is thereafter placed in a red dye bath. A typical bath of this character is:

Fuchsin (Schultz-Julius, No. 512) P, 1 gram; auramin (Schultz-Julius, No. 493) O, 3 grams; alcohol, 500 ccs.; glycerin, 30 ccs.; acetic acid glacial, 12 ccs.; water, 2000 ccs.

By subjecting the film to this bath for approximately five minutes the dyeing operation will be complete and any excess of the dye may be removed by washing the film in clear water for two minutes, after which the ferricyanide of the blue toned image is removed by an alkaline solution, leaving the top picture red. This alkaline solution may be a 1 2/10% solution of sodium hydroxide in water. The blue color discharge will take place in approximately two minutes. The film is now washed in plain water until the images are cleared, after which the film is replaced in the blue toning bath and the second image toned completely. This treatment does not affect the red top picture.

After the toning has been completed the film may be washed in plain water. The film is now treated with the following solution:

Potassium ferricyanide, 4 grams; chromic acid, 4 grams; water, 500 ccs.

This treatment modifies the blue of the blue toned image into a green. A final washing in an acid bath for a period of one minute will complete the formation of the green image. This bath is slightly acidified with glacial acetic acid 1:100. A final washing of the film is made in plain water to complete the process. It is preferable in making the various baths and carrying out the process, that the solutions have an approximate temperature of 20° C.

By examination it will now be seen that the top image will be red and the lower green and that as these two images are in absolute register, they will be complementary to each other to such a degree as to blend in combination to form a picture in natural colors.

Theoretically, the process would consist merely in toning the first image, then dyeing the correct red, then clearing and fixing, then toning the second image, then dyeing the correct green, then clearing and fixing.

The dyes will, however, tend to replace each other, thus some of the green will replace some of the red, thereby causing an undesirable modification of the red.

To prevent or minimize the replacement of dyes the following modification of the above described process may be made use of:

(1) Top image is toned blue.

(2) Top image is dyed strong red, say with fuchsin only.

(3) Blue is removed with alkali.

(4) Dye is further fixed as desired, using for this purpose tannin or ordinary metallic salt mordants.

(5) Second image is toned blue.

(6) Film is dyed with a yellow for the purpose of modifying the red into an orange red simultaneously with the modification of the blue into a green.

(7) Alkaline treatment to mordant the yellow in second image, to retain enough of the blue to retain a green image.

The preferred method is, however, the simplest and most rapid, and will produce pictures in agreement artistically with the original subject photographed.

What is claimed is:

1. A method of producing colored photographic film which consists in exposing a film sensitized with a layer of silver halide emulsion from opposite sides thereof to produce within said layer an inner and outer series of images in registry and of selected intensity and color values, developing said images, toning and dyeing the outer series of said images, treating the outer series of said images with a solution adapted to leave the outer images the color employed in the dyeing step, and toning and dyeing the inner series of images.

2. A method of producing a colored photographic film from a film sensitized with a layer of silver halide emulsion and having formed within said layer at opposite sides thereof, outer and inner black silver images in registry and of selected color values, which consists in treating said film to a toning solution for approximately one minute to tone the outer image, washing the film to remove any excess of toning solution, subjecting the film to a dye bath for approximately five minutes to dye the outer image, washing the film to remove any excess of dye, treating the film in an alkaline solution, replacing the film in a toning bath to tone the inner image, and then dyeing the inner image.

3. A method of producing a colored photographic film from a film sensitized with a single layer of silver halide emulsion and having formed within said layer at opposite sides thereof inner and outer black silver images in registry and of selected color values, which consists in treating the film for approximately one minute to a blue toning solution to mordant the outer image, dyeing said mordanted image, treating said dyed image to remove an element employed in the toning solution, then treating the film to a toning solution to mordant the inner image and subsequently dyeing said inner image.

4. A method of producing a colored photographic film from a film sensitized with a silver halide emulsion having formed within said emulsion at opposite sides thereof two black silver images in registry and of selected color values, which consists in first treating the film to a blue toning solution whereby to mordant the exterior image without affecting the interior image, removing the excess toning solution, dyeing said toned image red, removing excess dye, treating the red image with an alkaline solution, thereafter treating the film to a blue toning solution to tone the interior image and subsequently modifying the blue of the last-named image into a green.

5. A method of producing colored photographic film from a film having in a single colloid emulsion inner and outer images derived from sensitive silver salt originally contained in said emulsion, in registry, and of selected color values, which consists in treating the film to a toning solution for approximately one minute to tone the outer image, subjecting the film to a dye bath for approximately five minutes to dye the outer image, treating the film with an alkaline solution then treating the film to a toning bath to tone the inner image, and finally dyeing the inner image.

6. A method of producing colored photographic film from a film having in a single colloid emulsion inner and outer images derived from sensitive silver salt originally contained in said emulsion, in registry, and of selected color values, which consists in treating the film with a blue toning solution for approximately one minute to mordant the outer image, subjecting the film to a red dye bath for approximately five minutes to dye the outer image, treating the outer dyed image to remove the ferricyanide of the blue toning solution, thereafter treating the film with a blue toning solution to tone the inner image, and finally dyeing the inner image.

In testimony whereof I have hereunto set my hand.

LEON F. DOUGLASS.